United States Patent [19]

Morii et al.

[11] Patent Number: 4,795,927
[45] Date of Patent: Jan. 3, 1989

[54] CONTROL SYSTEM FOR A MAGNETIC TYPE BEARING

[75] Inventors: Shigeki Morii; Keiichi Katayama, both of Kanonshin, Japan

[73] Assignee: Mitsubishi Jukogyo Kabushiki Kaisha, Tokyo, Japan

[21] Appl. No.: 42,212

[22] Filed: Apr. 24, 1987

[30] Foreign Application Priority Data

May 2, 1986 [JP] Japan ................................ 61-102255
Jun. 16, 1986 [JP] Japan ................................ 61-139824

[51] Int. Cl.$^4$ ............................................. F16C 39/00
[52] U.S. Cl. ..................................... 310/90.5; 324/208
[58] Field of Search ................ 310/90.5; 324/207, 208, 324/225, 226, 227, 241, 242, 243

[56] References Cited

U.S. PATENT DOCUMENTS 4,686,404 8/1987 Nakazeki ............................ 310/90.5

FOREIGN PATENT DOCUMENTS 0157693 10/1985 European Pat. Off. ........... 310/90.5
0201894 11/1986 European Pat. Off. ........... 310/90.5
0097916 6/1982 Japan ................................ 310/90.5
0037322 2/1984 Japan ................................ 310/90.5
2095004 9/1982 United Kingdom .............. 310/90.5

OTHER PUBLICATIONS

"Electromagnetic Suspension and Levitation", Jayawant et al., IEEE Proc., vol. 129, Nov. 1982, pp. 549-550 and pp. 570-571.
"An Active Magnetic Bearing System", Habermann, et al., Tribology International Apr. 1980, pp. 85-89.
"Practical Magnetic Bearings", Habermann et al., IEEE Spectrum, Sep. 1979, pp. 26-30.
"On the Study of High-Frequency Self-Excited Oscillation in Flexible Rotor System with Active Magnetic Bearing", S. Morii et al., SICE '87 Jul. 15-17, Hiroshima, Japan pp. 1139-1142.

Primary Examiner—R. Skudy
Attorney, Agent, or Firm—Birch, Stewart, Kolasch & Birch

[57] ABSTRACT

A control system for a magnetic type bearing is fed back a signal from a position sensor with respect to a floating member to effect control such as phase compensation so that the magnetic type bearing is actively employed. In order to change unstabilizing force produced by the magnetic type bearing in a specified frequency range to stabilizing force, a first signal obtained by causing the signal from the position sensor to pass through a first filter having a cut-off frequency range corresponding to a predetermined frequency range in which stabilization is to be attained and a second signal obtained by causing a signal having an opposite polarity to that of the signal from the position sensor to pass through a second filter having a passing frequency range which is substantially identical with the predetermined frequency range are added to each other and the addition signal is fed back to an electromagnet.

8 Claims, 6 Drawing Sheets

F I G. 2
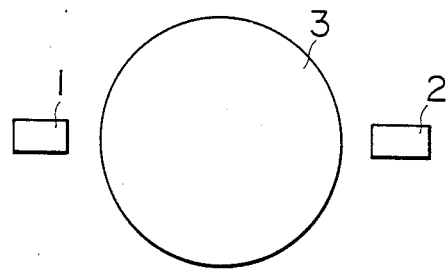
F I G. 3(a)
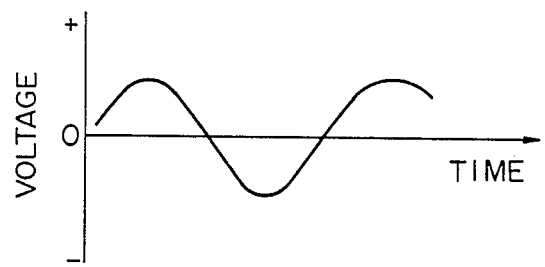
F I G. 3(b)
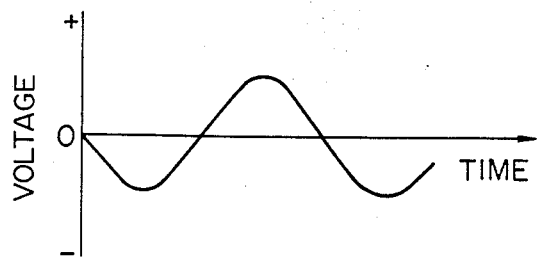

(FIRST CHARACTERISTIC FREQUENCY)

(SECOND CHARACTERISTIC FREQUENCY)

(THIRD CHARACTERISTIC FREQUENCY)

(FOURTH CHARACTERISTIC FREQUENCY)

(FIFTH CHARACTERISTIC FREQUENCY)

CONTROL SYSTEM FOR A MAGNETIC TYPE BEARING

BACKGROUND OF THE INVENTION a. Field of the Invention

The present invention relates to a control system for a magnetic type bearing for floating a high-speed rotating member such as a spindle for use in a turbo-pump, a compressor, a turbine or a machine tool and further a traveling member such as a tenter.

b. Description of the Related Art

Means for floatingly holding a rotating member and a traveling member have utilized a magnetic type bearing employing an electromagnet. The magnetic type bearing has less loss than that of a conventional lubricated hydraulic bearing, maintains a dry, clean atmosphere and in particular is useful under vacuum.

In the magnetic type bearing, in order to establish a float position of the rotating member and the traveling member, there is provided a system in which a position of a floating member is measured to determine a current value flowing in the electromagnet on the basis of the measured signal so that a magnitude of a magnetic force produced from the electromagnet is determined.

Referring to FIG. 7 showing a block diagram illustrating the above manner, a position sensor 11 measures a position (displacement) of the floating member and may be, for example, an eddy current type displacement meter. A position feed-back gain circuit 12 proportionally multiplies a magnitude of a signal obtained by the position sensor 11 to a required magnitude. A control circuit 13 is a processing circuit for converting a signal obtained by the position feed-back gain circuit 12 to a proper signal to supply the signal to an electromagnet 14 and may be, for example, a PID (Proportion, Integration and Differentiation) circuit, a phase compensation circuit or a combination thereof. The electromagnet 14 includes a coil wound on an iron core and produces a magnetic force for floating the member in response to a current supplied from the control circuit 13.

A simple position feed-back system has the control circuit 13 formed of only a proportional element (P element). The transfer function of an input I and a magnetic force F of an output of the electromagnet 14 is given by the following first-order lag system which depends on resistors and inductances of a coil and an iron core.

$$F/I = K_M/(1+T_M\cdot S) \tag{1}$$

where $K_M$ is a gain of the electromagnet 14, $T_M$ is a time constant of the electromagnet 14, and S is a Laplacian operator. Accordingly, the transfer function of the force F exerted on the floating member with respect to the displacement D measured by the position feed-back system is as follow:

$$F/D = K_F\cdot K_P\cdot K_m/(1+T_M\cdot S) \tag{2}$$

where $K_F$ is a proportional gain of the position feed-back gain circuit 12 and $K_P$ is a proportional gain of the control circuit 13. In order to observe a frequency characteristic of the force/displacement (F/D) of the position feed-back system, the Laplacian operator is set to $S = j2\pi f$ in which f is a frequency (Hz) and $j = \sqrt{-1}$ and is substituted in the equation (2). The force/displacement (F/D) is a complex number as follow:

$$F/D = K_R(f) + j\cdot K_I(f) \tag{3}$$

The real part $K_R$ of the force/displacement (F/D) in the above equation (3) means stiffness dependent on the frequency f and an imaginary part $K_I$ thereof means attenuation dependent on the frequency f. The first-order lag as described in the equation (2) has always a negative imaginary part and the attenuation forms an unstabilizing force for the floating member.

FIG. 8 is a graph showing a relation of the force/displacement (F/D), that is, a relation of a value of the imaginary part of the equation (3) and the frequency f. A dashed line A shown in FIG. 8 corresponds to the equation (2) and shows the above-described state. A characteristic frequency fc determined by the floating member and the position feed-back system increases divergently and the system can not operate due to the attenuation of the characteristic frequency fc, particularly the attenuation of the floating member if a value of the frequency f=fc shown in FIG. 8 is large.

Thus, in order to give the attenuation effect to the force/displacement (F/D) of the position feed-back system, the control circuit 13 comprises a differential element (D element) or a position compensation element disposed in parallel with the proportional element (P element). In this description, the differential element is taken up by way of example. When the differential element (D element) is added to the control circuit 13, the following first-order lag is added to the circuit.

$$\text{Differential Element} = K_D\cdot S/(1+T_D\cdot S) \tag{4}$$

where $K_D$ is a gain of the differential element and $T_D$ is a time constant. The force/displacement (F/D) of the position feed-back system including only the differential element is as follow:

$$F/D = K_F\cdot K_D\cdot K_M\cdot S/\{(1+T_D\cdot S)(1+T_M\cdot S)\} \tag{5}$$

Since the numerator of the equation (5) is an equation of a first degree of S and the denominator thereof is an equation of a second degree of S, the imaginary part of the equation (5) is given by a one-dot chain line B shown in FIG. 8. That is, the attenuation effect is given to the floating member in a low frequency range and the unstabilizing operation is given to the floating member in a high frequency range. In order to hold the position of the floating member, the control circuit 13 requires both of the proportional element and the differential element. The force/displacement (F/D) of the position feed-back system of the control circuit 13 is given by $$F/D = K_F\cdot\{K_P + K_D\cdot S/(1+T_D\cdot S)\}\cdot K_M/(1+T_M\cdot S) \tag{6}$$

The force/displacement (F/D) is also shown by a solid line C of FIG. 8 and has the same characteristic as described above. When the characteristic frequency fc determined by the floating member and the position feed-back system is placed in a low frequency range having the attenuation effect, stabilization can be obtained and operation can be made without occurrence of vibration.

When it is considered that the magnetic type bearing having the above characteristic is employed as a bearing 16 of a rotating member 15 shown in FIG. 9(a) to float the rotating member 15, the following phenomenon occurs. The rotating member 15 has unlimited number of characteristic frequencies the first five of which are shown in FIGS. 9(b), (c), (d), (e) and (f). The attenuation of material of the rotating member 15 itself acts on unstabilization with respect to the characteristic frequency less than a rotational number of the member and acts as the attenuation operation with respect to the characteristic frequency larger than the rotational number.

Accordingly, it is necessary to set the characteristic frequency less than the rotational number within the frequency range in which the attenuation effect of the force/displacement (F/D) of the position feed-back system of the magnetic type bearing is brought. However, since the number of the characteristic frequencies of the rotating member 15 is unlimited as shown in FIGS. 9(b), (c), (d), (e) and (f), the characteristic frequency certainly exists in the frequency range in which the unstabilizing operation of the force/displacement (F/D) is effected. Accordingly, when the unstabilizing operation of the position feed-back system of the magnetic type bearing is larger than the attenuation of the characteristic frequency by the rotating member 15 itself, operation is destabilized and vibration of the rotating member increases divergently, so that the rotating member can not be rotated.

As described above, heretofore, in order to hold the position of the floating member, the position of the floating member is measured and the measured signal is fed back to produce force from the electromagnet. However, the force is destabilizing force which vibrates the floating member. Thus, even if processing such as the PID and phase compensation is provided in the control circuit 13, the force is the stabilizing force (attenuation) in the low frequency range, while the force still contains a large destabilizing force in a middle and high frequency range. Accordingly, the floating member such as the rotating member having the unlimited number of characteristic frequencies certainly includes the characteristic frequency existing in the frequency range in which the destabilizing force is produced and divergent vibration occurs by means of the magnetic type bearing.

SUMMARY OF THE INVENTION

It is an object of the present invention to provide a control system for a magnetic type bearing in which destabilizing force produced by the magnetic type bearing in a specified frequency range is changed to stabilizing force (attenuation force) to prevent occurrence of divergent vibration so that a floating member is floated stably.

BRIEF DESCRIPTION OF THE DRAWINGS

FIGS. 1 to 5 show a first embodiment of the present invention, in which:

FIG. 1 is a block diagram showing a configuration of a control system for a magnetic type bearing;

FIG. 2 is a plan view showing a mounting state of a first and second position sensors;

FIGS. 3(a) and (b) are waveform diagrams showing output signals of the first and second sensors, respectively;

FIG. 5 is a characteristic diagram showing an attenuation characteristic of the magnetic type bearing;

DETAILED DESCRIPTION OF THE INVENTION

Embodiments of the present invention are now described.

Figure 1:
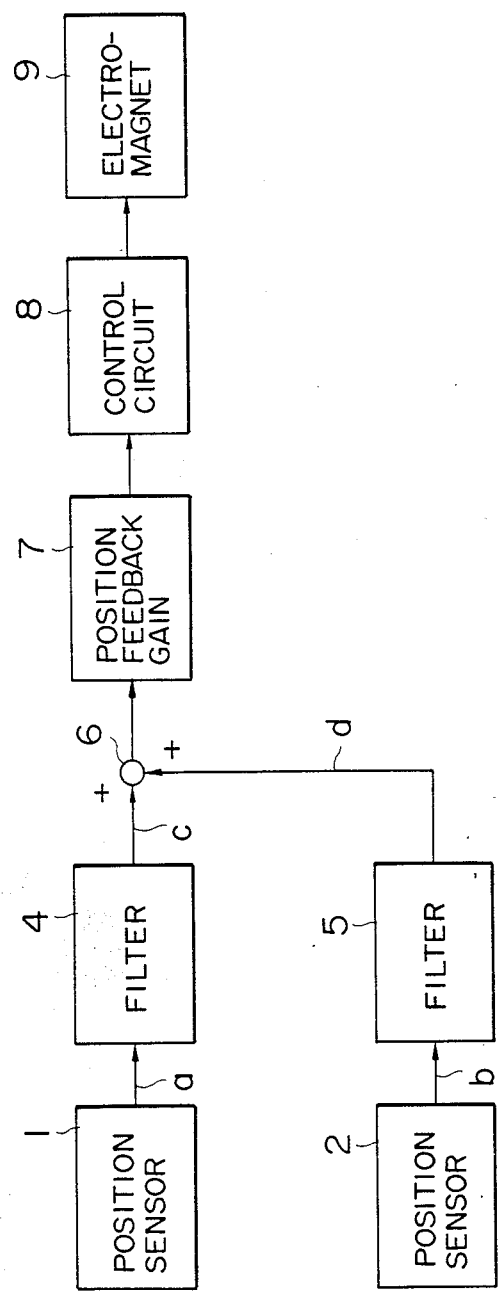

FIG. 1 is a block diagram showing a configuration of a first embodiment of the present invention. In FIG. 1, numerals 1 and 2 denote first and second position sensors, respectively, for measuring a position (displacement) of a floating member and which may be, for example, eddy current displacement type sensors. The first and second position sensors 1 and 2 are disposed at opposite positions around a rotating member 3 as shown in FIG. 2. In FIG. 2, the rotating member 3 is shown as one example of the floating member, while it is not limited to the rotating member.

In FIG. 1, numeral 4 denotes a first filter to which a signal of the first position sensor 1 is supplied, numeral 5 denotes a second filter to which a signal of the second position sensor 2 is supplied, numeral 6 denotes an adder which adds signals passed through the first and second filters, numeral 7 denotes a position feedback gain circuit for proportionally multiplying the addition output of the adder 6 to a required magnitude, and numeral 8 denotes a control circuit for converting a signal from the position feedback gain circuit 7 to a proper signal to supply it to an electromagnet 9. The control circuit 8 may be, for example, a PID (Proportion-Integration-Differentiation) circuit, a phase compensation circuit or a combination thereof. The electromagnet 9 also includes a coil wound on an iron core and produces a magnetic force for floating the rotating member 3 in response to a current supplied by the control circuit 8.

When a signal supplied to the first filter 4 from the first position sensor 1 is a and a signal supplied to the second filter 5 from the second position sensor 2 is b, the signal a has an inverted amplitude of that of the signal b with respect to operation of the floating member, that is, is shifted 180° in phase from the signal b as shown in FIGS. 3(a) and (b). Accordingly, when the signal a has, for example, a value of +5, the signal b has a value of −5.

Figure 4A:
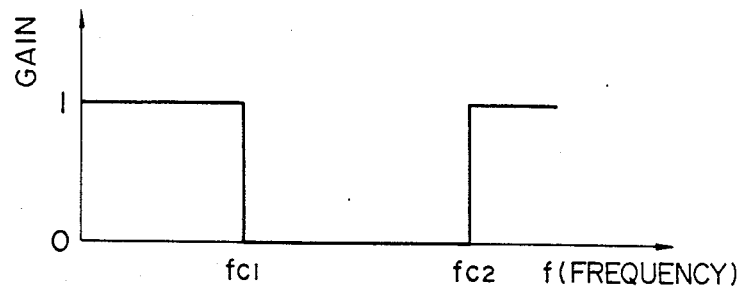
FIGS. 4(a) and (b) are characteristic diagrams showing gain-frequency characteristics of a first and second filters, respectively.
Figure 4B:
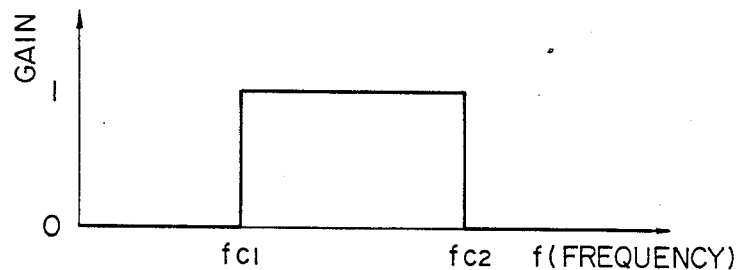

FIGS. 4(a) and (b) show gain characteristics of the first and second filters 4 and 5, respectively. As shown in FIG. 4(a), the first filter 4 has a cut-off characteristic (the gain thereof is zero) in a predetermined frequency range in which the floating member is to be stabilized, that is, in a range from a frequency $f_{c1}$ to a frequency $f_{c2}$, while the second filter 5 has a passing characteristic (the gain thereof is 1) in the range from the frequency $f_{c1}$ to the frequency $f_{c2}$ reversely as shown in FIG. 4(b).

The signal a from the first position sensor 1 and the signal b from the second position sensor 2 are supplied to the adder 6 through the first and second filters 4 and 5, respectively, and are added to each other in the adder 6. More particularly, the signal a from the first position sensor 1 is supplied as a first signal c to the adder 6 through the first filter 4 and the signal b from the second position sensor 2 is supplied as a second signal d to the adder 6 through the second filter 5 so that the two signals c and d are added to each other. The addition signal is supplied through the position feedback gain circuit 7 to the control circuit 8.

When the force/displacement (F/D) of the magnetic type bearing is expressed by a complex function such as the equation (3), the force/displacement (F/D) of the magnetic type bearing in the path provided with the first position sensor 1 in the frequency range from $f_{c1}$ to $f_{c2}$ is as follows:

$$F/D = 0 \qquad (7\text{-}1)$$

The force/displacement (F/D) in the other frequency range is as follow:

$$F/D = K_R(f) + j \cdot K_I(f) \qquad (7\text{-}2)$$

Since the polarity of the signal b from the second position sensor 2 is quite opposite to that of the signal a, the force/displacement (F/D) in the frequency range from $f_{c1}$ to $f_{c2}$ is as follows:

$$F/D = -K_R(f) - j \cdot K_I(f) \qquad (8\text{-}1)$$

The force/displacement (F/D) in the other frequency range is as follows:

$$F/D = 0 \qquad (8\text{-}2)$$

Finally, both are added and the added value in the frequency range from $f_{c1}$ to $f_{c2}$ is as follows:

$$F/D = -K_R(f) - j \cdot K_I(f) \qquad (9\text{-}1)$$

The value in the other frequency range is as follows:

$$F/D = K_R(f) + j \cdot K_I(f) \qquad (9\text{-}2)$$

Figure 5:
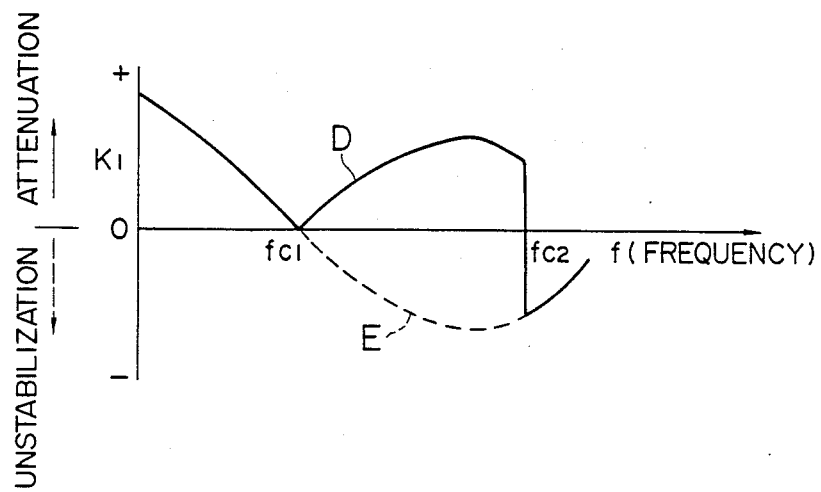

Accordingly, the attenuation characteristic of the magnetic type bearing is as shown by a solid line D of FIG. 5, that is, the destabilizing force shown by a dashed line E of FIG. 5 in the frequency range of $f_{c1}$–$f_{c2}$ is changed to stabilizing force. Accordingly, the characteristic frequency in the frequency range is stabilized and occurrence of the divergent vibration is prevented.

Further, the cut-off frequency range $f_{c1}$–$f_{c2}$ of the first filter 4 and the passing frequency range $f_{c1}$–$f_{c2}$ of the second filter 5 are not required to be identical with each other in the strict sense and the frequency ranges may be shifted by deviation at the boundaries of the band width due to adjustment. The gains of the first and second filters 4 and 5 may be different from each other.

In the first embodiment, a signal portion of the signal a from the first position sensor 1 in the frequency range which produces the unstabilizing force is cut off in the first filter 4 and a signal portion of the signal b from the second position sensor 2 in the frequency range which is inverted 180° with respect to the signal a and produces the stabilizing force passes through the second filter 5. Both the signals from the first and second filters 4 and 5 are added and fed back, and accordingly force produced by the magnetic type bearing is changed to the stabilizing force.

According to the embodiment, the position of the floating member is measured by the first and second position sensors 1 and 2 from two opposite directions and the measured signals are passed through the first and second filters 4 and 5 having opposite passing and cut-off characteristics, respectively, the signals passed through the filters being added and fed back. Accordingly, there can be provided the control system for the magnetic type bearing which converts the unstabilizing force produced by the magnetic type bearing to the stabilizing force to prevent the divergent vibration of the floating member so that the floating member can be floated stably.

Figure 6:
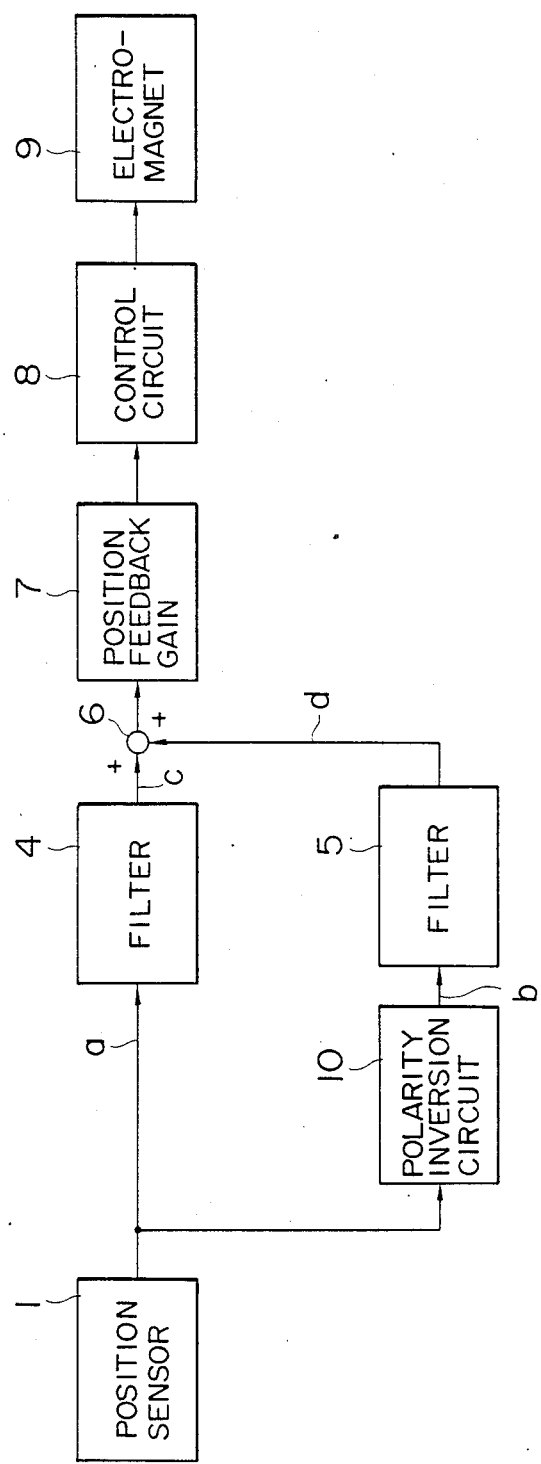
FIG. 6 is a block diagram of a control system for a magnetic type bearing showing a second embodiment of the present invention.
Figure 7:
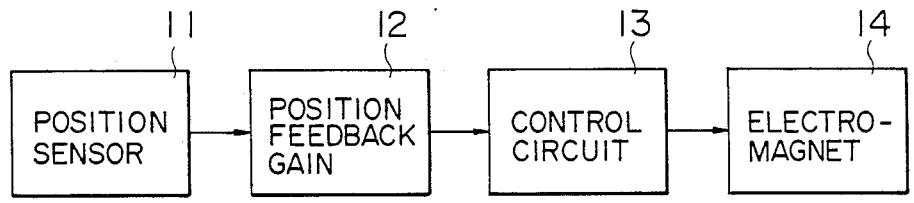
FIG. 7 is a block diagram showing a configuration of a conventional control system for a magnetic type bearing.
Figure 8:
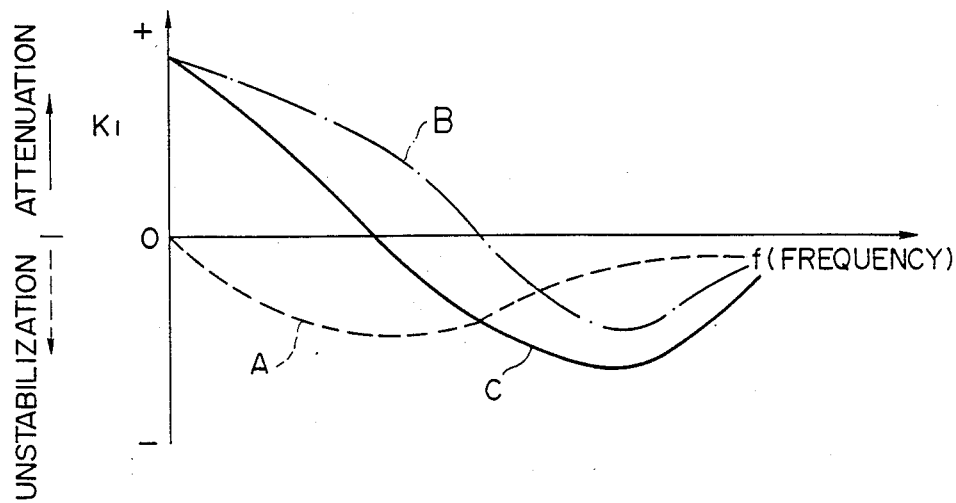
FIG. 8 is a characteristic diagram showing an attenuation characteristic of the magnetic type bearing controlled by the conventional control system.
Figure 9A:
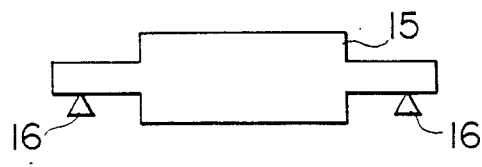
FIGS. 9(a)-(f) show a rotating member and characteristic frequencies.
Figure 9B:
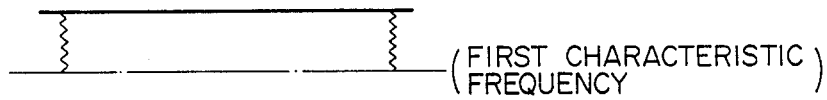
Figure 9C:
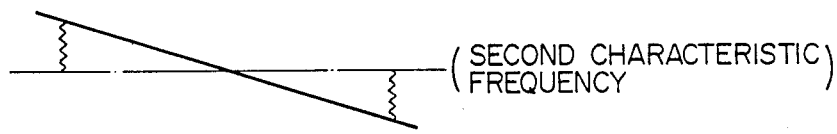
Figure 9D:
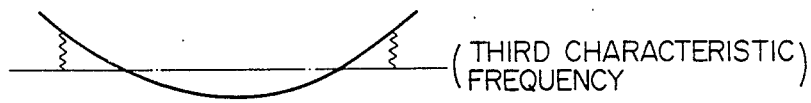
Figure 9E:
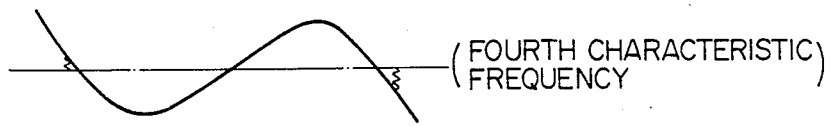
Figure 9F:
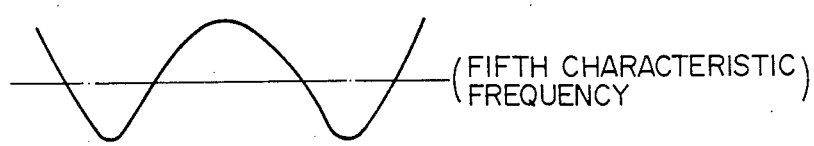

FIG. 6 is a block diagram showing a second embodiment of the present invention, in which the same elements as those of FIG. 1 are given like numerals.

In FIG. 6, numeral 10 denotes a polarity inversion circuit which inverts the polarity of a signal.

The signal from the first position sensor 1 is divided into two signals. One signal a passes through the first filter 4 as it is, while the other signal b is polarity-inverted by the polarity inversion circuit 10 and subsequently passes through the second filter 5.

In this case, the signals a and b supplied to the first and second filters 4 and 5, respectively, have quite opposite amplitude with respect to movement of the floating member in the same manner as shown in FIGS. 3(a) and (b), that is, are shifted 180° in phase each other.

In the second embodiment, since the configuration of the latter part subsequent to the first and second filters 4 and 5 are identical with the configuration of the first embodiment shown in FIG. 1, it is understood that the second embodiment attains the same effect as that of the first embodiment.

More particularly, since a signal portion of one signal in the frequency range which produces the unstabilizing force is cut off by the first filter 4 while a signal portion of the inverted signal of the other signal in the frequency range which produces the stabilizing force is passed through the second filter 5 and the addition of both the signals are fed back, force produced by the magnetic type bearing is all changed to the stabilizing force.

According to the second embodiment, the signal from the position sensor 1 is divided into two signals. One signal a thereof passes through the first filter 4 having a cut-off band corresponding to the frequency band in which stabilization is desired. The other signal b is polarity-inverted and passes through the second filter 5 having a passing band corresponding to the cut-off band. Both the signals from the filters 4 and 5 (that is, first and second signals c and d) are added and fed back to the magnetic type bearing to convert the signals to force by means of the electromagnet. Accordingly, there can be provided the control system for the magnetic type bearing which changes the unstabilizing force produced by the magnetic type bearing in the specified frequency range to the stabilizing force (attenuation force) and can prevent the occurrence of the divergent vibration so that the floating member can be floated stably.

Further, the present invention is not limited to the first and second embodiments. For example, in the second embodiment, while the other signal is inverted just after the signal from the position sensor 1 is divided into two signals, the other signal may be inverted after the second filter 5, that is, before adder 6. Furthermore, while the stabilization is attained in one frequency range from $f_{c1}$ to $f_{c2}$ in the first and second embodiments, the stabilization may be attained in a plurality of frequency ranges or all frequency ranges above $f_{c1}$ in accordance with characteristics of the floating member and the magnetic type bearing. It is a matter of course that various modifications can be made without departing from the gist of the present invention.

What is claimed is:

1. A control system for a magnetic bearing having an electromagnet for positioning a floating member at a predetermined frequency comprising:

position sensor means for measuring the position of the floating member along a sensor axis colinear with a potential axis of movement of said floating member and developing a sensor output indicative thereof;

control means, responsive to a position feedback signal, for controlling the current to the electromagnet to control the position of the floating member, said electromagnet attracting the floating member along said sensor axis in response to the current supplied by said control means; and stabilizing means, responsive to said sensor output of said position sensor means, for developing said position feedback signal, said stabilizing means inverting the polarity of the output of said position sensor means when said predetermined frequency is within a frequency range where destabilization normally occurs to stabilize said bearing within said frequency range.

2. The control system of claim 1 wherein said stabilizing means includes:

means for dividing said sensor output into first and second output signals;

a first filter receiving said first output and passing said first output signal to said control means as said position feedback signal at those normally stable frequencies outside said frequency range where destabilization normally occurs;

an inverter receiving and inverting said second output signal;

a second filter operatively connected to said inverter for passing said inverted second output signal to said control means as said position feedback signal only at frequencies within said frequency range where destabilization normally occurs.

3. The control system of claim 2 wherein the pass frequencies of said first and second filters are complementary so that only one of said first and second output signals is provided to said control means as said position feedback signal.

4. The control system of claim 1 wherein said position sensor means comprises first and second position sensor positions on opposed sides of said floating member along said sensor axis and developing complementary first and second sensor outputs;

said stabilizing means supplying said first sensor output to said control means as said position feedback signal outside the frequency range where destabilization normally occurs.

5. The control system of claim 4 wherein said stabilizing means includes:

a first filter receiving said first sensor output and passing said first sensor output to said control means as said position feedback signal at those normally stable frequencies outside said frequency range where destabilization normally occurs; and a second filter receiving said second sensor output and passing said second sensor output signal to said control means as said position feedback signal only at frequencies within said frequency range where destabilization normally occurs.

6. The control system of claim 4 wherein the pass frequencies of said first and second filters are complementary so that one of said first sensor output and second sensor output is provided to said control means as said position feedback signal.

7. The control system of claim 1 wherein said stabilizing means includes:

means for dividing said sensor output into first and second output signals;

a first filter receiving said first output signal and passing said first output signal to said control means as said position feedback signal at those normally stable frequencies outside said frequency range where destabilization normally occurs;

a second filter receiving said second output signal and passing said second output signal only at frequencies within said frequency range where destabilization normally occurs; and an inverter receiving said second output signal when passed by said second filter and inverting said second output to form said position feedback signal.

8. The control system of claim 7 wherein the pass frequencies of said first and second filters are complementary so that only one of said first and second output signals is provided to said control means as said position feedback signal.

* * * * *